United States Patent
Rafferty et al.

(10) Patent No.: US 11,110,798 B2
(45) Date of Patent: Sep. 7, 2021

(54) MULTI-FUNCTION VEHICLE INPUT APPARATUSES WITH OPERATIONAL BUTTONS FOR VEHICLE SYSTEMS CONTROL AND METHODS INCORPORATING THE SAME

(71) Applicant: Toyota Motor Engineering & Manufacturing North America, Inc., Plano, TX (US)

(72) Inventors: John Charles Rafferty, Dexter, MI (US); Lou M. Pope, Ypsilanti, MI (US); Clinton J. Williams, Saline, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 377 days.

(21) Appl. No.: 16/264,054

(22) Filed: Jan. 31, 2019

(65) Prior Publication Data
US 2020/0247241 A1    Aug. 6, 2020

(51) Int. Cl.
| | |
|---|---|
| B60K 37/06 | (2006.01) |
| B62D 1/04 | (2006.01) |
| G06F 3/02 | (2006.01) |
| G02B 27/01 | (2006.01) |
| G06F 3/0484 | (2013.01) |

(52) U.S. Cl.
CPC .............. *B60K 37/06* (2013.01); *B62D 1/046* (2013.01); *B60K 2370/1446* (2019.05);
(Continued)

(58) Field of Classification Search
CPC ............ B60R 11/0264; B60R 11/0229; B60R 11/0235; B60R 2011/001; B60K 35/00;
(Continued)

(56) References Cited

U.S. PATENT DOCUMENTS

| | | | |
|---|---|---|---|
| 9,186,994 B2 | 11/2015 | Okuyama et al. | |
| 9,481,246 B2 | 11/2016 | Kim et al. | |
| (Continued) | | | |

FOREIGN PATENT DOCUMENTS

| | | |
|---|---|---|
| DE | 102009033383 A1 | 1/2011 |
| JP | 3736599 B2 | 1/2006 |
| (Continued) | | |

*Primary Examiner* — Christopher E Leiby
(74) *Attorney, Agent, or Firm* — Dinsmore & Shohl LLP

(57) ABSTRACT

A multi-function input apparatus of a steering wheel that includes a plurality of outer buttons that correspond to a plurality of vehicle systems, such that actuation of at least one of the plurality of outer buttons selects a corresponding vehicle system from the plurality of vehicle systems. The apparatus includes a touch pad having a capacitive touch surface that is positioned adjacent the plurality of outer buttons. In response to actuation of the capacitive surface the touch pad is configured to navigate through and select a setting of a plurality of settings of the selected vehicle system. The apparatus further includes a confirmation button positioned adjacent to the touch pad that corresponds to a confirmation input such that actuation of the confirmation button actuates the selected setting of the selected vehicle system.

18 Claims, 4 Drawing Sheets

(52) U.S. Cl.
CPC ...... *B60K 2370/52* (2019.05); *G02B 27/0149* (2013.01); *G06F 3/0202* (2013.01); *G06F 3/04847* (2013.01); *G09G 2380/10* (2013.01)

(58) Field of Classification Search
CPC .............. B60K 37/06; B60K 2370/782; B60K 2370/1446; B60K 2370/1529; B60K 2370/52; G02B 27/0101; G02B 27/0149; G02B 2027/0194; G02B 2027/014; G02B 2027/0165; G02B 2027/0154; G02B 2027/0138; G02B 2027/0169; G02B 2027/0163; G02B 2027/0187; G06F 3/167; G06F 3/0202; G06F 3/04847; G09G 2380/10
See application file for complete search history.

(56) References Cited

U.S. PATENT DOCUMENTS

| | | |
|---|---|---|
| 9,813,768 B2 | 11/2017 | Chow |
| 9,921,792 B2 | 3/2018 | Hori et al. |
| 2013/0106693 A1* | 5/2013 | Okuyama ............. G06F 3/0482 345/157 |
| 2013/0332844 A1* | 12/2013 | Rutledge ............... G06F 3/0484 715/744 |
| 2015/0215676 A1* | 7/2015 | Chow .................. G06F 3/04883 386/234 |
| 2015/0283998 A1* | 10/2015 | Lind ...................... B60W 30/17 701/23 |
| 2016/0341962 A1* | 11/2016 | Amaru ................ B60R 11/0264 |
| 2017/0060249 A1* | 3/2017 | Scheufler .............. B60K 37/06 |

FOREIGN PATENT DOCUMENTS

| | | |
|---|---|---|
| JP | 2007106353 A | 4/2007 |
| JP | 4757091 B2 | 8/2011 |
| WO | 2015133070 A1 | 9/2015 |
| WO | 2017130815 A1 | 8/2017 |
| WO | 2017216869 A1 | 12/2017 |

\* cited by examiner

MULTI-FUNCTION VEHICLE INPUT APPARATUSES WITH OPERATIONAL BUTTONS FOR VEHICLE SYSTEMS CONTROL AND METHODS INCORPORATING THE SAME

TECHNICAL FIELD

The present specification generally relates to input devices for controlling various vehicle systems and processes, and more specifically, to a multi-function input apparatus that provides a central control location for operating various vehicle systems and that includes multiple shortcut buttons for operational control of the vehicle systems.

BACKGROUND

Vehicles generally include numerous systems, devices, and apparatuses on-board for use by occupants of the vehicle. For example, vehicles may generally include audio systems, communication devices, navigation apparatuses, cabin temperature systems, and the like. Such systems, devices, and apparatuses may generally include an abundance of settings, functionality, and selective controls that may be interacted with and/or adjusted by an occupant of the vehicle. These systems, devices, and apparatuses may generally require numerous input apparatuses within the vehicle for controlling their respective operation. Due to the varying functionality of such systems, devices, and apparatuses, an occupant of the vehicle may be required to perform complicated operation of input apparatuses to provide the desired control of the vehicle systems, devices, and apparatuses.

By engaging in extensive operation of an input apparatus, an occupant of the vehicle, such as an operator (e.g., driver), may be required to divert her attention from operating the vehicle in order to actuate the input apparatus to adequately control a vehicle system, device, or apparatus and/or to determine a relative desired setting with respect to the particular vehicle system, device, or apparatus being controlled. Diverting attention from operating the vehicle may generally entail an occupant diverting her eyes from a front of the vehicle, removing her hands from an apparatus controlling operation of the vehicle (e.g., a steering wheel), and/or other activities that may impair an occupant's uninterrupted control of the vehicle. Providing an input apparatus that facilitates an operation of multiple vehicle systems, devices, and/or apparatuses and a selective control of their corresponding settings and/or functionality may generally promote an uninterrupted control of the vehicle.

SUMMARY

In one embodiment, a multi-function input apparatus of a steering wheel includes a plurality of outer buttons that correspond to a plurality of vehicle systems, such that actuation of at least one of the plurality of outer buttons selects a corresponding vehicle system from the plurality of vehicle systems. The multi-function input apparatus includes a touch pad having a capacitive touch surface, with the touch pad positioned adjacent to the plurality of outer buttons. In response to actuation of the capacitive surface the touch pad is configured to navigate through and select a setting of a plurality of settings of the selected vehicle system. The multi-function input apparatus further includes a confirmation button positioned adjacent to the touch pad that corresponds to a confirmation input such that actuation of the confirmation button actuates the selected setting of the selected vehicle system.

In another embodiment, a steering wheel of a vehicle includes an outer rim, a center hub disposed within the outer rim, and an input apparatus positioned on the center hub. The input apparatus includes a plurality of outer buttons, a touch pad, and a confirmation button. The touch pad is positioned adjacent to the plurality of outer buttons and the confirmation button, and the touch pad includes a capacitive surface. The plurality of outer buttons correspond to a plurality of vehicle systems such that actuation of at least one of the plurality of outer buttons selects a corresponding vehicle system. A plurality of settings of the selected vehicle system are navigable in response to actuation of capacitive surface of the touch pad and at least one of the plurality of settings is selectable in response to actuation of the confirmation button.

In another embodiment, a multi-function input apparatus of a vehicle having a steering wheel includes a touch pad positioned on the steering wheel of the vehicle, the touch pad including a capacitive surface that is selectively actuated in response to conductive contact with the capacitive surface. The apparatus includes a plurality of outer buttons positioned so as to partially border the touch pad, and a confirmation button positioned so as to partially border the touch pad. The apparatus includes a processor and non-transitory computer-readable medium storing computer-readable instructions that, when executed, causes the processor to select a vehicle system in response to at least one of the plurality of outer buttons being actuated. The process navigates a plurality of settings of the selected vehicle system in response to actuation of the capacitive surface, and actuates at least one of the plurality of settings in response to the confirmation button being actuated.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
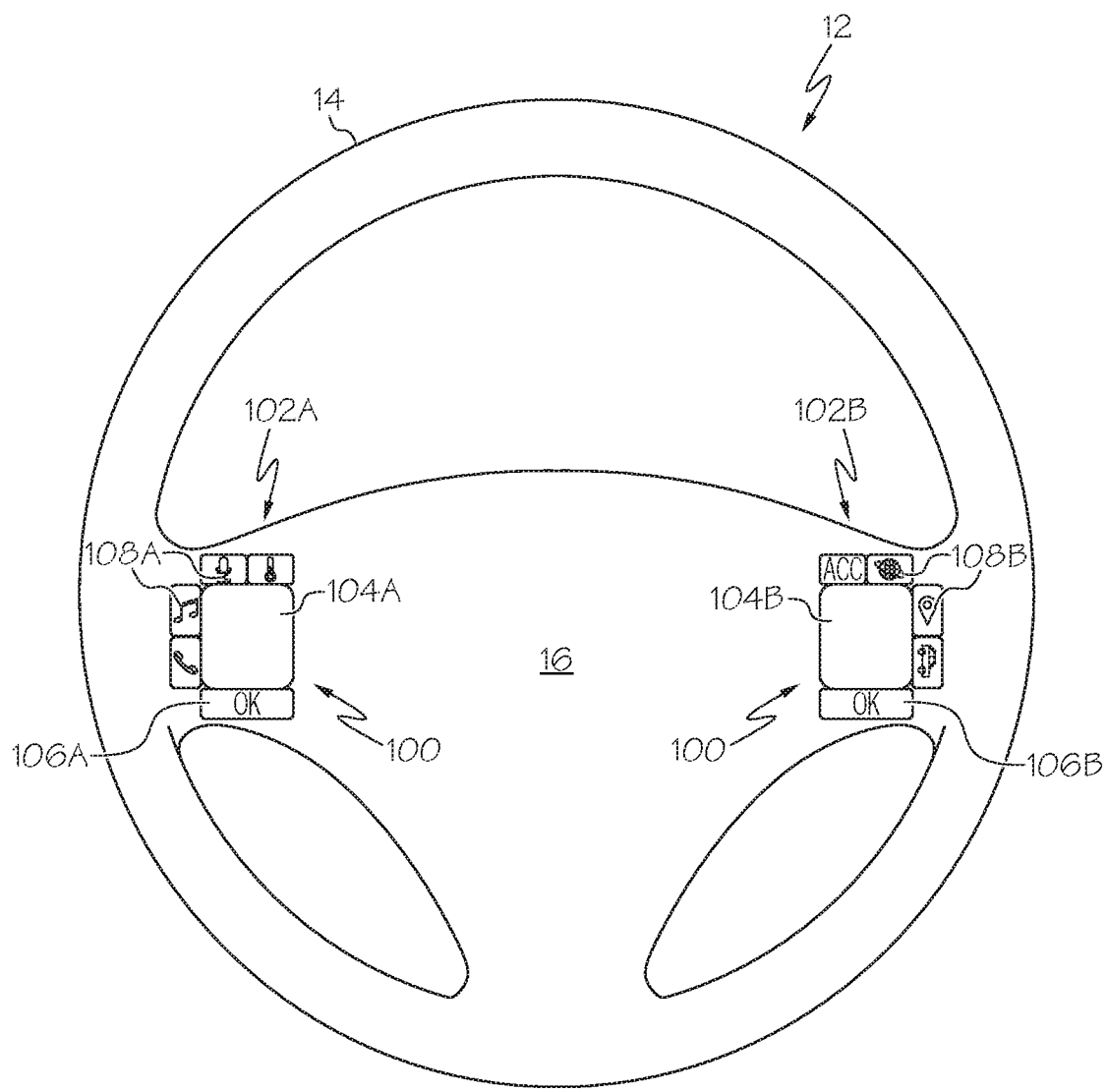
FIG. 1 schematically depicts an illustrative view of a multi-function input apparatus positioned on a steering wheel of a vehicle, according to one or more embodiments shown and described herein.

Embodiments of the present disclosure are generally directed to multi-function input apparatuses that may provide vehicle support control for an occupant of a vehicle, and in particular, selective control and operation of one or more devices or systems of the vehicle at a central location within a passenger cabin of the vehicle. For example, the multi-function input apparatus may be positioned along a steering wheel of the vehicle such that the multi-function input apparatus is centrally located near an operator of the vehicle to facilitate ease of access. In some embodiments, the multi-function input apparatus is position on a steering wheel such that thumbs of an operator of a vehicle are positioned above the multi-function input apparatus when the operator grasps the steering wheel. Vehicle devices or systems that may be controlled by the multi-function input apparatus of the present disclosure may include, for example, an HVAC device, an audio system, a visual interface or heads-up display, a communication module, and the like. A manual actuation of the multi-function input apparatus may provide a selective activation of various vehicle systems and may further provide elaborate navigation and/or control of a plurality of settings corresponding to the vehicle system that is actuated. The multi-function switch apparatus may generally include touch pad disposed within a plurality of operational shortcut buttons to improve an accessibility of the various vehicle systems that correspond to the plurality of shortcut buttons.

One non-limiting example of a multi-function input apparatus of a steering wheel includes a plurality of outer buttons (i.e., operational buttons) that correspond to a plurality of vehicle systems, such that actuation of at least one of the plurality of outer buttons selects a corresponding vehicle system from the plurality of vehicle systems. The multi-function input apparatus includes a touch pad having a capacitive touch surface, with the touch pad positioned adjacent to the plurality of outer buttons. In response to actuation of the capacitive surface the touch pad is configured to navigate through and select a setting of a plurality of settings of the selected vehicle system. The multi-function input apparatus further includes a confirmation button positioned adjacent to the touch pad that corresponds to a confirmation input such that actuation of the confirmation button actuates the selected setting of the selected vehicle system.

Although embodiments herein are described in the context of multi-function input apparatuses controlling various vehicle systems or devices for automotive vehicles, embodiments are not limited thereto. For example, the multi-function input apparatuses described herein may be configured and compatible for use with various transportation systems, including, for example, motorcycles, bicycles, watercrafts, aircrafts, and/or the like. Other uses should generally be understood and are included within the scope of the present disclosure.

Figure 4:
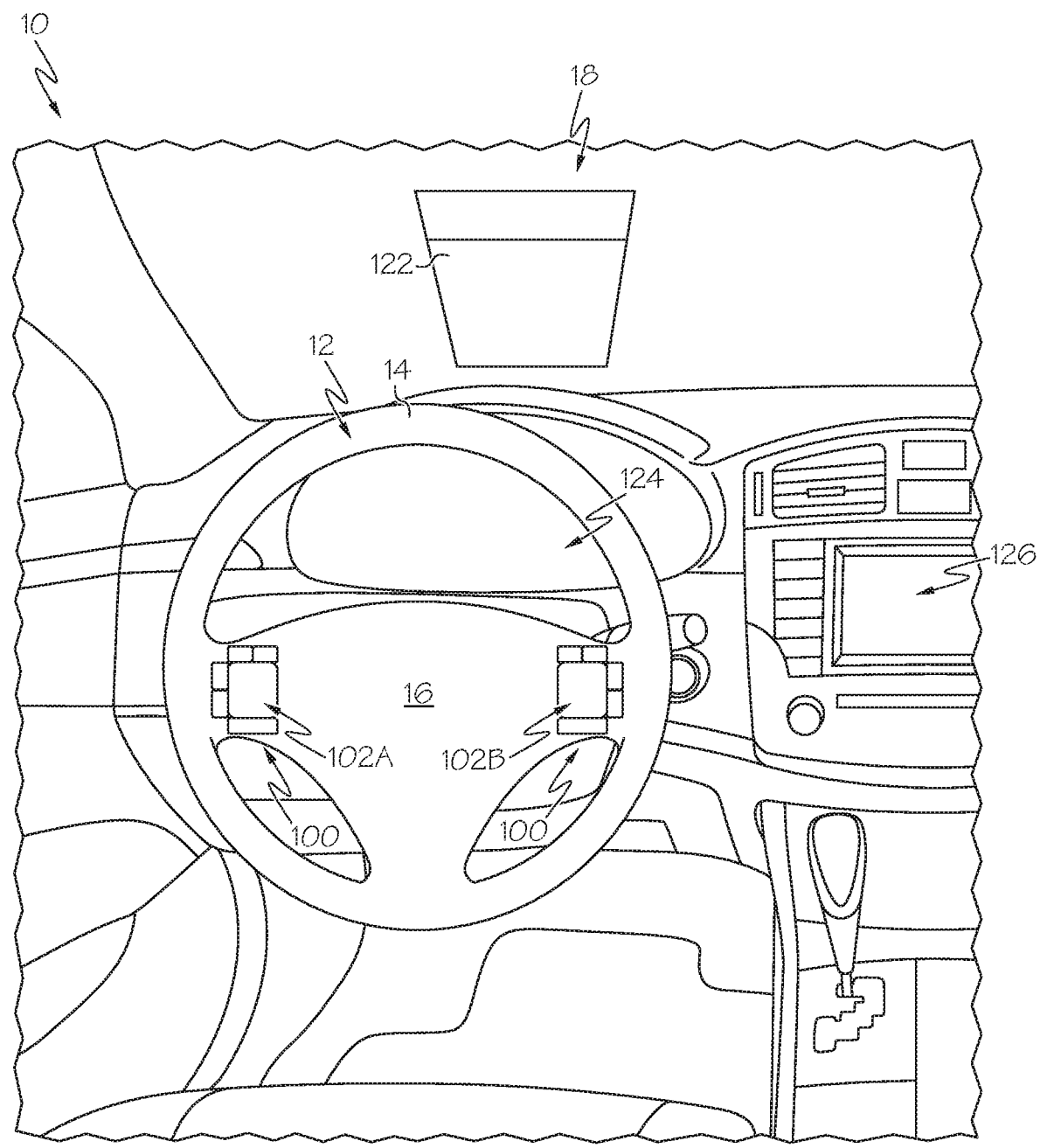
FIG. 4 schematically depicts the multi-function input apparatus of FIG. 1 communicatively coupled to one or more displays devices in a vehicle, according to one or more embodiments shown and described herein.

Referring now to the drawings, FIG. 1 generally depicts a steering wheel 12 of a vehicle 10 (FIG. 4) including one or more user interface hardware 100 positioned thereon. In particular, illustrative multi-function input apparatuses 102A, 102B (i.e., user interface hardware 100) are depicted in FIG. 1 along a center hub 16 of the steering wheel 12. The input apparatuses 102A, 102B are positioned within an outer rim 14 of the steering wheel 12 along regions of the center hub 16 where an occupant of the vehicle 10, and in particular where an operator of the vehicle 10 generally grasps the steering wheel 12 to operate the vehicle 10. In the present example, the steering wheel 12 includes a pair of input apparatuses 102A, 102B positioned along the center hub 16 at locations corresponding to a location where an operator's thumbs may generally be positioned when grasping the outer rim 14 of the steering wheel 12. It should be understood that the pair of input apparatuses 102A, 102B may be positioned along various other regions of the center hub 16, the steering wheel 12 (e.g., the outer rim 14), and/or other surfaces within a passenger cabin of the vehicle 10 (FIG. 4). For example, one or more input apparatuses 102A, 102B may be positioned adjacent to a front passenger seat of the vehicle 10, a rear passenger seat of the vehicle 10, and the like.

It should be further understood that in other embodiments the steering wheel 12 may include additional or fewer input apparatuses 102A, 102B than those shown and depicted herein. Additionally, the steering wheel 12 of the vehicle 10 may include other user interface hardware 100 (e.g., input hardware 110) positioned thereon in addition to the input apparatuses 102A, 102B described herein. It should be understood that the input apparatuses 102A, 102B described and depicted herein are substantially similar to one another except for the differences explicitly noted herein.

Still referring to FIG. 1, the input apparatus 102A includes a touch pad 104A, a confirmation button 106A, and a plurality of outer buttons 108A. The confirmation button 106A and the plurality of outer buttons 108A of the input apparatus 102A extend about the touch pad 104A such that the touch pad 104A is disposed within and at least partially surrounded or encapsulated by the confirmation button 106A and the plurality of outer buttons 108A. The confirmation button 106A and the plurality of outer buttons 108A of the present example include a rectangular profile, however, it should be understood that the confirmation button 106A and the plurality of outer buttons 108A may have various other profiles, shapes, or sizes without departing from a scope of the present disclosure. The confirmation button 106A and the plurality of outer buttons 108A may be independently actuated. In some embodiments, the confirmation button 106A and the plurality of outer buttons 108A may be independently depressible relative to the touch pad 104A and toward the center hub 16 of the steering wheel 12. In particular, the confirmation button 106A and the plurality of outer buttons 108A may translate in response to applying a predetermined force thereon. In some embodiments, the touch pad 104A is relatively fixed such that the touch pad 104A is not depressible. In other embodiments, the touch pad 104A is depressible toward the center hub 16 of the steering wheel 12. It should be understood that the confirmation button 106A and the plurality of outer buttons 108A may be capacitive touch pads and/or haptic touch pads that may be actuated independently in response to a conductive touch.

It should be understood that the confirmation button 106A of the input apparatus 102A may include a label positioned thereon, with the label corresponding to a corresponding function performed by the confirmation button 106A in response to actuating (i.e., depressing) the confirmation button 106A. It should further be understood that the plurality of outer buttons 108A of the input apparatus 102A may include vehicle system labels positioned thereon, with the vehicle system label on each of the plurality of outer buttons 108A corresponding to a vehicle system or device effectively controlled by the input apparatus 102A. Accordingly, a relative label along the outer button 108A of the plurality of outer buttons 108A may be indicative of the particular outer button 108A to actuate (e.g., depress) to initiate selection of the respective vehicle system corresponding to the vehicle system label on the outer button 108A. As merely an illustrative example, a first input apparatus 102A, positioned along a vehicle-outboard side of the center hub 16 of the steering wheel 12, may include a plurality of outer buttons 108A including one or more vehicle system labels positioned therein, each corresponding to one or more vehicle systems or devices controlling a temperature of a passenger cabin of the vehicle 10 (e.g., a heating, ventilation and air-conditioning system), a microphone of the vehicle 10, an audio system, and/or a communications module. It should be understood that although the input apparatus 102A of the present example is described and depicted herein as including four outer buttons 108A positioned about the touch pad 104A, in other embodiments alternative, additional, and/or fewer outer buttons 108A may be included about the touch pad 104A of the input apparatus 102A.

Still referring to FIG. 1, the input apparatus 102B includes a touch pad 104B, a confirmation button 106B, and a plurality of outer buttons 108B. The confirmation button 106B and the plurality of outer buttons 108B of the input apparatus 102B extend about the touch pad 104B such that the touch pad 104B is disposed within and at least partially surrounded or encapsulated by the confirmation button 106B and the plurality of outer buttons 108B. The confirmation button 106B and the plurality of outer buttons 108B of the present example include a rectangular profile, however, it should be understood that the confirmation button 106B and the plurality of outer buttons 108B may have various other profiles, shapes, or sizes without departing from a scope of the present disclosure. The confirmation button 106B and the plurality of outer buttons 108B may be independently actuated. In some embodiments, the confirmation button 106B and the plurality of outer buttons 108B may be independently depressible relative to the touch pad 104B and toward the center hub 16 of the steering wheel 12. In particular, the confirmation button 106B and the plurality of outer buttons 108B may translate in response to applying a predetermined force thereon. In some embodiments, the touch pad 104B is relatively fixed such that the touch pad 104B is not depressible. In other embodiments, the touch pad 104B is depressible toward the center hub 16 of the steering wheel 12. It should be understood that the confirmation button 106B and the plurality of outer buttons 108B may be capacitive touch pads and/or haptic touch pads that may be actuated independently in response to a conductive touch.

It should be understood that the confirmation button 106B of the input apparatus 102B may include a label positioned thereon, with the label corresponding to a corresponding function performed by the confirmation button 106B in response to actuating (i.e., depressing) the confirmation button 106B. It should further be understood that the plurality of outer buttons 108B of the input apparatus 102B may include vehicle system labels positioned thereon, with the vehicle system label on each of the plurality of outer buttons 108B corresponding to a vehicle system or device effectively controlled by the input apparatus 102B. Accordingly, a relative label along the outer button 108A of the plurality of outer buttons 108B may be indicative of the particular outer button 108A to actuate (e.g., depress) to initiate selection of the respective vehicle system corresponding to the vehicle system label on the outer button 108B.

As merely an illustrative example, a first input apparatus 102B, positioned along a vehicle-outboard side of the center hub 16 of the steering wheel 12, may include a plurality of outer buttons 108B including one or more vehicle system labels positioned therein, each corresponding to one or more vehicle systems or devices controlling a temperature of a passenger cabin of the vehicle 10 (e.g., a heating, ventilation and air-conditioning system), a microphone of the vehicle 10, an audio system, and/or a communications module. It should be understood that although the input apparatus 102B of the present example is described and depicted herein as including four outer buttons 108B positioned about the touch pad 104B, in other embodiments alternative, additional, and/or fewer outer buttons 108B may be included about the touch pad 104B of the input apparatus 102B.

Figure 2:
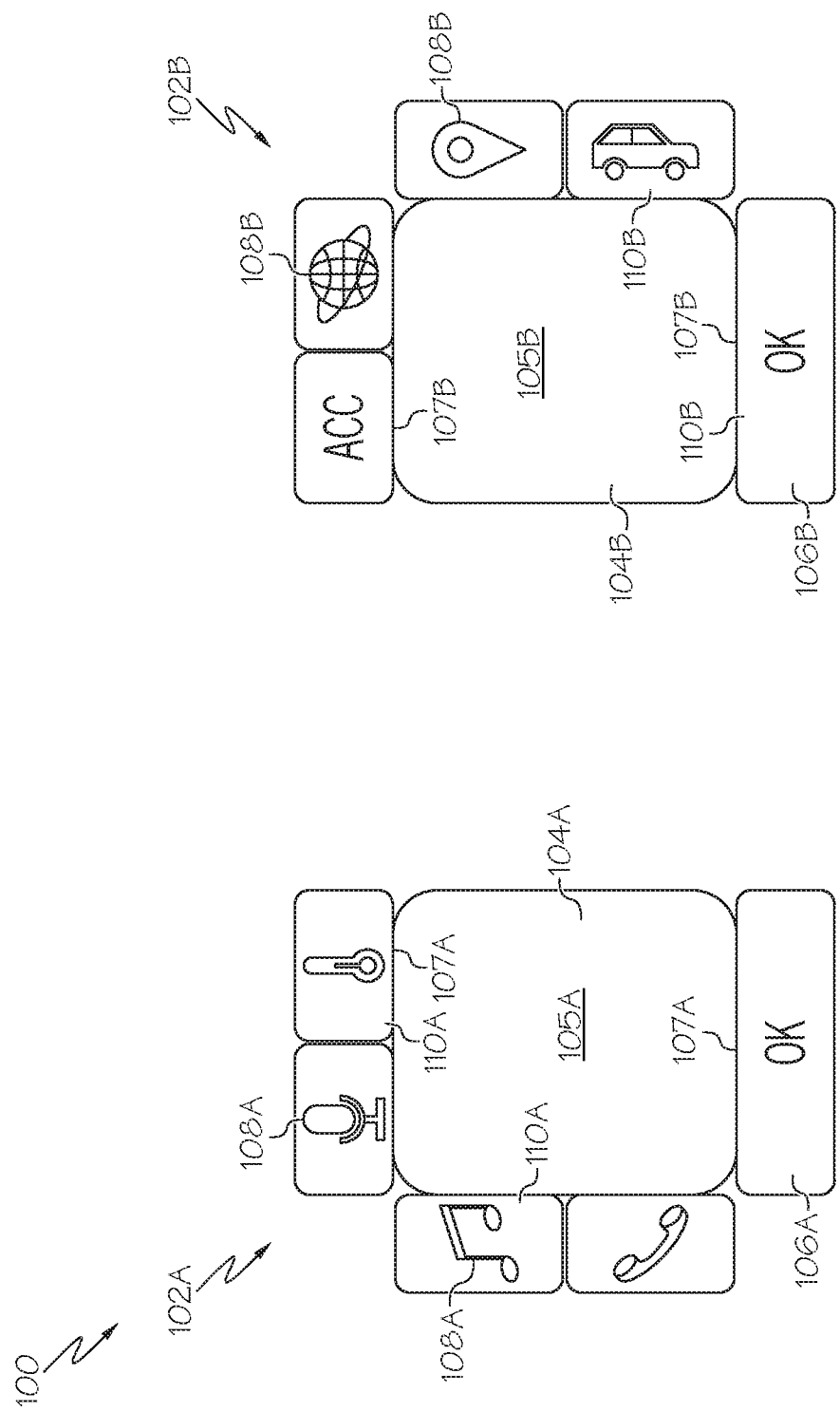
FIG. 2 schematically depicts a partially enlarged view of the multi-function input apparatus of FIG. 1, according to one or more embodiments shown and described herein.

Additional description of the input apparatuses 102A, 102B will be provided with respect to FIG. 2, in which no distinction is made between the input apparatus 102A and the input apparatus 102B, such that the description herein corresponds to each of the input apparatus 102A and the input apparatus 102B.

Referring now to FIG. 2, the touch pad 104A, 104B of the input apparatus 102A, 102B is a touch pad that includes a capacitive touch surface 105A, 105B extending thereon. Accordingly, the touch pad 104A, 104B of the input apparatus 102A, 102B is responsive to a capacitive touch received thereon by an occupant. In other embodiments, the touch pad 104A, 104B of the input apparatus 102A, 102B may include a haptic touch pad, a touch sensor, and/or the like. The touch pad 104A, 104B is configured to detect contact between the capacitive touch surface 105A, 105B of the touch pad 104A, 104B and an occupant, such as, for example, a finger of an occupant's hand received thereon.

With the confirmation button 106A, 106B and the plurality of outer buttons 108A, 108B disposed about and positioned adjacent to the touch pad 104A, 104B, a corresponding edge of the confirmation button 106A, 106B and the plurality of outer buttons 108A, 108B borders and/or abuts against an adjacent edge of the touch pad 104A, 104B to form a border 107A, 107B defined therebetween, respectively. The border 107A, 107B provides an abutment and/or physical barrier between the touch pad 104A, 104B and the confirmation button 106A, 106B and the plurality of outer buttons 108A, 108B. In this instance, an occupant actuating the touch pad 104A, 104B may be able to physically perceive a boundary extent of the touch pad 104A, 104B when encountering the border 107A, 107B between the touch pad 104A, 104B and the adjacent confirmation button 106A, 106B and the plurality of outer buttons 108A, 108B. It should be understood that in some embodiments the confirmation button 106A, 106B and/or the plurality of outer buttons 108A, 108B may be elevated relative to the capacitive touch surface 105A, 105B of the touch pad 104A, 104B such that an offset elevation along the edges of the touch pad 104A, 104B and the confirmation button 106A, 106B and/or the plurality of outer buttons 108A, 108B may effectively form the border 107A, 107B described herein. In this instance, with the capacitive touch surface 105A, 105B of the touch pad 104A, 104B disposed within the confirmation button 106A, 106B and the plurality of outer buttons 108A, 108B, a location of the touch pad 104A, 104B may be easily identified by an occupant of the vehicle 10 by contacting the input apparatus 102A, 102B and detecting the relatively lower elevation of the touch pad 104A, 104B surrounding the adjacent elevated surfaces of the confirmation button 106A, 106B and the plurality of outer buttons 108A, 108B.

Still referring to FIG. 2, in some embodiments, an edge between each of the plurality of outer buttons 108A, 108B may further define a border therebetween to provide a physical barrier for determining a relative location of each of the plurality of outer buttons 108A, 108B. Accordingly, an occupant may not be required to divert her eyes and/or attention from a front windshield 18 of the vehicle 10 (FIG. 4) to determine a relative location of an occupant's finger along the touch pad 104A, 104B, the confirmation button 106A, 106B, and the plurality of outer buttons 108A, 108B.

Additionally or alternatively, in other embodiments the input apparatus 102A, 102B is configured to generate a tactile and/or audible feedback in response to a contact against the capacitive touch surface 105A, 105B of the touch pad 104A, 104B and/or actuation (i.e. depression) of the confirmation button 106A or the plurality of outer buttons 108A, 108B. In this instance, an occupant of the vehicle 10 may detect and perceive an actuation of the touch pad 104A, 104B, the confirmation button 106A, 106B, and/or the plurality of outer buttons 108A, 108B of the input apparatus 102A, 102B in response to the tactile and/or audible feedback generated as a result thereof.

In some embodiments, the confirmation button 106A, 106B and/or the plurality of outer buttons 108A, 108B are resiliently biased to inhibit a depression. Further, upon actuating (e.g., depressing) the confirmation button 106A, 106B and/or at least one of the plurality of outer buttons 108A, 108B of the input apparatus 102A, 102B relative to a default position, an occupant may release the confirmation button 106A, 106B and/or the outer button 108A, 108B. The confirmation button 106A, 106B and/or the outer button 108A, 108B may be resiliently biased to return to the default position. In this instance, the confirmation button 106A, 106B and/or the outer button 108A, 108B is required to be physically maintained in position by an occupant in order to continue an input of a confirmatory command and/or a control of a respective vehicle systems hardware 220 (FIG. 5) corresponding to the outer button 108A, 108B, respectively. Accordingly, releasing the confirmation button 106A, 106B and/or the outer button 108A, 108B may effectively terminate a corresponding command and/or control of the vehicle systems hardware 220 (FIG. 4). In other embodiments, the confirmation button 106A, 106B and/or the outer button 108A, 108B may remain in the depressed position despite a release of the confirmation button 106A, 106B and/or the outer button 108A, 108B by an occupant. In this instance, a subsequent depression of the confirmation button 106A, 106B and/or the outer button 108A, 108B may be required to release the confirmation button 106A, 106B and/or the outer button 108A, 108B and terminate the corresponding control input. Still in other embodiments, the plurality of outer buttons 108A, 108B are configured to deactivate and/or become inoperable in response to an initial actuation (i.e., depression) of at least one of the plurality of outer buttons 108A, 108B. In this instance, an inadvertent actuation of a subsequent outer button 108A, 108B by an occupant is inhibited while the initially-selected vehicle systems hardware 220 corresponding to the actuated outer button 108A, 108B is being actively controlled.

Figure 3:
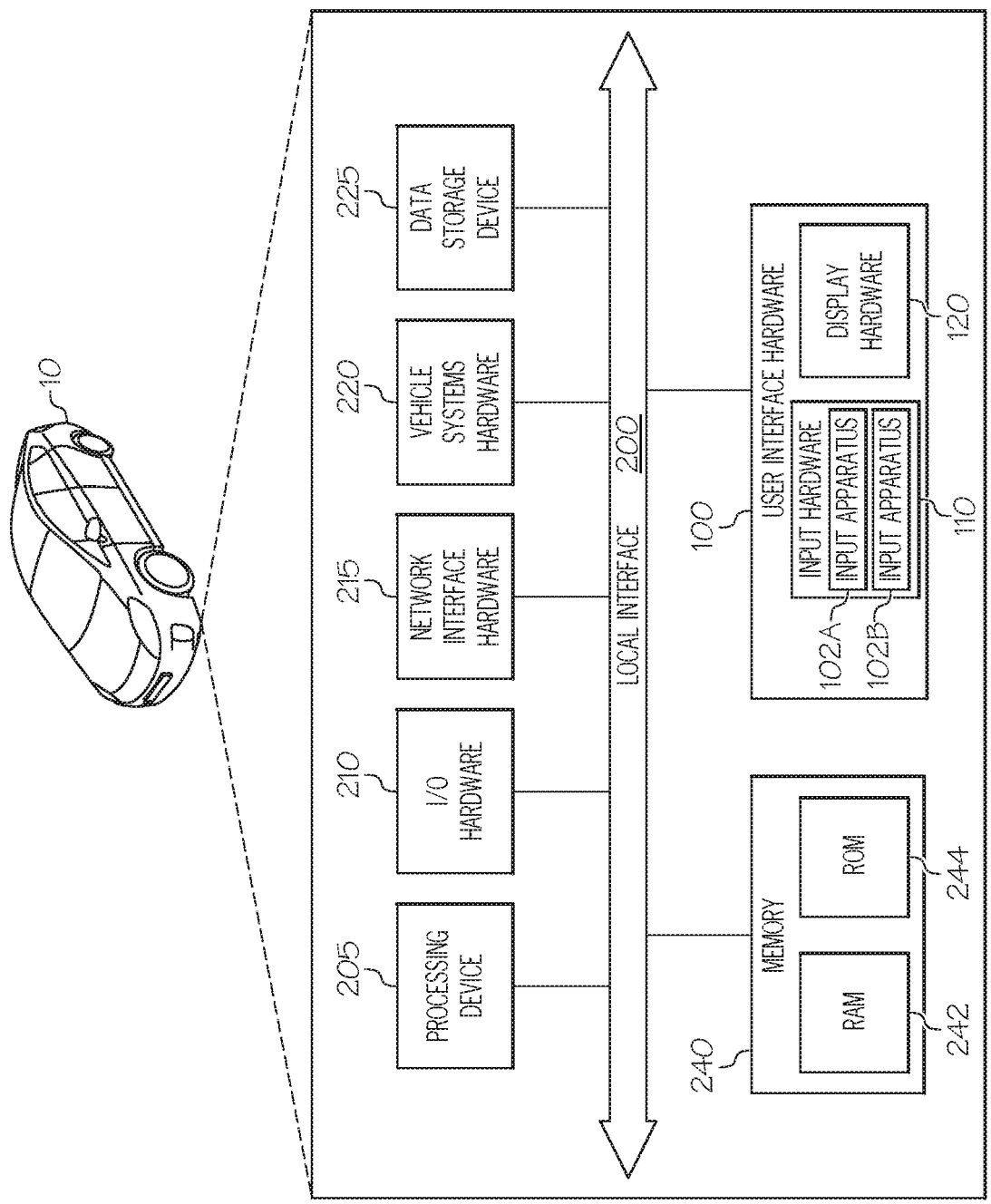
FIG. 3 schematically depicts illustrative hardware components of a vehicle including the multi-function input apparatus of FIG. 1, according to one or more embodiments shown and described herein.

Referring now to FIG. 3, illustrative hardware components of the vehicle 10 are schematically depicted. The hardware components of the vehicle 10 may be used to provide a functionality of one or more input apparatuses 102 described in further detail herein. Generally, the illustrative input apparatuses 102A, 102B depicted in FIG. 1 may be positioned within a vehicle 10 and provide particular use in assisting occupants of the vehicle 10 in controlling the vehicle 10 and/or various vehicle systems of the vehicle 10. However, it should be appreciated that the vehicle 10 is not limited to this use and may be used for other purposes without departing from the scope of the present disclosure.

The example vehicle 10 including the illustrative input apparatuses 102A, 102B generally includes a non-transitory computer-readable medium containing one or more programming instructions for completing the various processes described herein, which may be embodied as hardware, software, and/or firmware, according to embodiments shown and described herein. While in some embodiments the various components of the vehicle 10 may be configured as a general purpose computer with the requisite hardware, software, and/or firmware, in other embodiments, the various components of the vehicle 10 may also be configured as a special purpose computer designed specifically for performing the functionality described herein.

Still referring to FIG. 3, the vehicle 10 may include the user interface hardware 100, such as the input hardware 110 described above (including the input apparatus 102A and the input apparatus 102B), a processing device 205, I/O hardware 210, network interface hardware 215, vehicle systems hardware 220, a data storage device 225, and a non-transitory memory component 240. A local interface 200, such as a bus or the like, may interconnect the various components. The user interface hardware 100 may include any device, mechanism, system, interactive display, and/or various other hardware components for communicating information from an occupant to the vehicle 10, and in particular the one or more systems within the vehicle 10 (e.g., network interface hardware 215, vehicle systems hardware 220, and the like). For example, the user interface hardware 100 may include input hardware 110, such as the input apparatus 102 described above, a touch screen, button, microphone, and/or other device for receiving inputs from an occupant. The user interface hardware 100 may further include display hardware 120, such as, for example, a video card, heads-up display 122 (FIG. 4), dashboard display 124 (FIG. 4), console display 126 (FIG. 4), mirror display, and/or other device for sending or presenting visual data to a user. In some embodiments, the user interface hardware 100 may incorporate audio output hardware that generates and presents audible data to a user, such as, for example, spoken words, tones, music, and/or the like. It should be understood that the user interface hardware 100 may be integrated with the vehicle 10 in various other forms as described in more detail herein. It should further be understood that with an inclusion of the one or more input apparatus 102A, 102B of the present disclosure in the vehicle 10, fewer user interface hardware 100, and in particular fewer input hardware 110, may be required due to a plurality of vehicle systems effectively controlled at the input apparatus 102A, 102B.

The processing device 205, such as a computer processing unit (CPU), may be the central processing unit of the vehicle 10, performing calculations and logic operations to execute a program. The processing device 205, alone or in conjunction with the other components, is an illustrative processing device, computing device, processor, or combination thereof. The processing device 205 may include any processing component configured to receive and execute instructions (such as from the data storage device 225 and/or the memory component 240). The I/O hardware 210 may communicate information between the local interface 200 and one or more other components of the vehicle 10. For example, the I/O hardware 210 may act as an interface between the various components described with respect to FIG. 3 and other components of the vehicle 10, such as user interface hardware 100 (e.g., the input apparatus 102) that controls information communicated by an occupant of the vehicle 10 to vehicle systems hardware 220, network interface hardware 215, and the like for purposes of controlling an operation of various systems within the vehicle 10. The I/O hardware 210 may be utilized to transmit one or more commands from the input apparatus 102 to the other components of the vehicle 10 in some embodiments.

Still referring to FIG. 3, the network interface hardware 215 may include any wired or wireless networking hardware, such as a modem, LAN port, wireless fidelity (Wi-Fi) card, WiMax card, mobile communications hardware, and/or other hardware for communicating with other networks and/or devices. The vehicle systems hardware 220 may be one or more hardware components for providing a particular functionality or operation of the vehicle 10. For example, the vehicle systems hardware 220 may include a heating, ventilation and air conditioning (HVAC) system, a seat adjustment mechanism, a window, a mirror (e.g., side, rear, etc.), a Global Positioning System (GPS), an internet connectivity, a headlight activation, a communication module (e.g., telephonic devices), a multimedia electronic device, and/or the like. The data storage device 225, which may generally be a storage medium, may contain one or more data repositories for storing data that is received and/or generated. The data storage device 225 may be any physical storage medium, including, but not limited to, a hard disk drive (HDD), solid-state memory, removable storage, and/or the like. While the data storage device 225 is depicted as a local device, it should be understood that the data storage device 225 may be a remote storage device, such as, for example, a server computing device, cloud based storage device, or the like.

The memory component 240 may be configured as a volatile and/or a nonvolatile computer-readable medium and, as such, may include random access memory 242 (including SRAM, DRAM, and/or other types of random access memory), read only memory (ROM) 244, flash memory, registers, compact discs (CD), digital versatile discs (DVD), and/or other types of storage components. The memory component 240 may include one or more programming instructions thereon that, when executed by the processing device 205, cause the processing device 205 to complete various processes. The programming instructions stored on the memory component 240 may be embodied as a plurality of software logic modules, where each logic module provides programming instructions for completing one or more tasks, such as initiating control of the vehicle systems hardware 220 in response to selective actuation of the input apparatus 102.

Referring now to FIG. 4 in conjunction with FIG. 3, one or more of the vehicle systems hardware 220 may be controlled by an occupant of the vehicle 10 in response to receiving an input at the input hardware 110, and in particular at the one or more input apparatuses 102A, 102B. As mentioned above, the various components described with respect to FIG. 3 may be used to carry out one or more processes and/or provide functionality for controlling various vehicle systems in the vehicle 10. Illustrative examples of the various processes are described herein according to some embodiments. The various steps described herein are merely illustrative, such that additional, fewer or alternative steps are contemplated without departing from the scope of the present disclosure.

In the present example, the vehicle 10 includes a pair of input apparatuses 102A, 102B positioned along the center hub 16 of the steering wheel 12. In other embodiments, the pair of input apparatuses 102A, 102B may be positioned along various other surfaces and/or locations within a passenger cabin of the vehicle 10. An operator may utilize the pair of input apparatuses 102A, 102B to actuate one or more vehicle systems or devices in the vehicle 10. Further, an occupant may selectively control, navigate, adjust and manipulate a comprehensive list of settings, preferences, controls, options, data, functionality outputs, menus and the like of the one or more vehicle systems or devices with the pair of input apparatuses 102A, 102B. Initially, an input command may be received via at least one of the pair of input apparatuses 102A, 102B by actuating (i.e., depressing) at least one of the plurality of the outer buttons 108A, 108B of the input apparatus 102A, 102B that correspond to a particular vehicle system that an occupant desires to control. It should be understood that in other embodiments an input command may be initially received by actuating the touch pad 104A, 104B (e.g., contacting). An occupant may identify the desired vehicle systems hardware 220 to initiate control of by viewing the vehicle system labels located along the plurality of outer buttons 108A, 108B the input apparatus 102A, 102B.

Still referring to FIG. 4, the input apparatuses 102A, 102B are communicatively coupled to display hardware 120, and in particular to at least one of the heads-up display 122, the dashboard display 124, or the console display 126. The one or more programming instructions included in the memory component 240, when executed by the processing device 205, causes the processing device 205 to transmit corresponding information and data displayed on the display hardware 120 in response to an actuation of at least one of the plurality of the outer buttons 108A, 108B of the input apparatus 102A, 102B. In instances, with either the heads-up display 122, the dashboard display 124, and/or the console display 126 (i.e., display hardware 120) displaying a plurality of vehicle systems hardware 220 included in the vehicle 10, actuation of at least one of the plurality of the outer buttons 108A, 108B allows an occupant to select from a plurality of vehicle systems hardware 220. In particular, the one or more programming instructions included in the memory component 240, when executed by the processing device 205, causes the processing device 205 to detect an actuation (i.e., depression) of at least one of the plurality of the outer buttons 108A, 108B of the input apparatus 102A, 102B. In other embodiments, an occupant may actuate the input apparatus 102A, 102B by contacting the touch pad 104A, 104B, such as, for example, tapping the capacitive touch surface 105A, 105B of the touch pad 104A, 104B with a predetermined pattern (e.g., double tap). In this instance, the one or more programming instructions executed by the processing device 205 causes control of the vehicle systems hardware 220 to commence such that an occupant of the vehicle 10 receives control of the various operabilities of the vehicle systems hardware 220.

The one or more programming instructions included in the memory component 240, when executed by the processing device 205, causes the processing device 205 to initiate control of at least one of the vehicle systems hardware 220 in response to receiving an input command from the input apparatus 102A, 102B. For example, actuating the outer button 108A of the input apparatus 102A toward the center hub 16 of the steering wheel 12 may initiate control of a communication module (e.g., telephonic device) of the vehicle systems hardware 220 such that an occupant of the vehicle 10 thereby receives control of the various operabilities of the communication module. Upon identifying the vehicle systems hardware 220 desired to be controlled, as verified by an occupant at the display hardware 120 and confirmed by an occupant by actuating (i.e., depressing) the confirmation button 106A, an occupant may further actuate the input apparatus 102A, 102B by contacting the touch pad 104A, 104B. The one or more programming instructions included in the memory component 240, when executed by the processing device 205, further causes the processing device 205 to transmit a signal to the heads-up display 122, the dashboard display 124, and/or the console display 126 of the vehicle 10 in response to an occupant actuating the input apparatus 102A to select the particular vehicle systems hardware 220 to control (e.g., the communications module). In this instance, the heads-up display 122, the dashboard display 124, and/or the console display 126 may be dynamically updated to communicate information or data relating to the communications module for the occupant's review while determining a selective control of the communications module, such as, for example, of a plurality of settings, options, menus, functionality outputs, and the like.

In this instance, continued actuation of the input apparatus 102A, such as, for example, contact along the touch pad 104A, provides the one or more programming instructions executed by the processing device 205 to cause for a navigation through the plurality of settings, preferences, data, menus, options, functionality outputs and the like of the communications module (i.e., the selected-vehicle systems hardware 220). For instance, upon selecting control of the communications modules of the vehicle 10, slidably translating a finger of an occupant along the capacitive touch surface 105A of the touch pad 104A may provide an occupant an ability to navigate through a contact directory stored within the memory component 240, scroll through a historical record of recent communications conducted on the communication module, search for particular message data, and/or the like. In the present example, the processing device 205 detects a relative direction of contact by an occupant (e.g., by a finger of an occupant) as the occupant engages and translates her finger along the capacitive touch surface 105A of the touch pad 104A. The one or more programming instructions executed by the processing device 205 causes data corresponding to the relative direction of contact to be transmitted via a signal to the display hardware 120 for purposes of displaying a real-time navigation/control of a plurality of settings corresponding to the particular vehicle systems hardware 220 selected by the occupant.

For example, slidably translating a finger of an occupant in a relatively upward direction against the capacitive touch surface 105A of the touch pad 104A may provide a corresponding activity (e.g., a scrolling action) on the heads-up display 122, the dashboard display 124, and/or the console display 126 communicating said data to the occupant. In this instance, an occupant may selectively navigate through the plurality of settings of the vehicle system by selectively contacting the capacitive touch surface 105A of the touch pad 104A until identifying the setting desired to be controlled. For example, translating a finger along the touch pad 104A of the input apparatus 102A may initiate navigation control of the various operabilities of the communication module (e.g., telephonic device) of the vehicle systems hardware 220 such that an occupant of the vehicle 10 thereby may select a particular operability and/or setting to control.

Still referring to FIG. 4, as the touch pad 104A of the input apparatus 102A is actuated, the one or more programming instructions executed by the processing device 205 causes the display hardware 120 (e.g., the heads-up display 122, dashboard display 124, console display 126, and/or the like) to dynamically update and generate a real-time observation display of the extensive settings, preferences, data, menus, options, and/or functionality outputs of the communications module. When the particular vehicle system setting desired to be controlled by an occupant is effectively arrived at (e.g., scrolled to), the one or more programming instructions executed by the processing device 205 causes detection of an actuation of the particular setting of the communications module when the confirmation button 106A is depressed. An operator may effectively select the desired setting to actuate by observing the corresponding information dynamically displayed along the display hardware 120 (e.g., the heads-up display 122, dashboard display 124, console display 126, and/or the like) of the vehicle 10 as the touch pad 104A is contacted. In other words, upon arriving to the desired setting and/or functionality output of the communication module (i.e., vehicle systems hardware 220), an occupant actuates the confirmation button 106A of the input apparatus 102A toward the center hub 16 of the steering wheel to thereby actuate the selected setting, thereby applying control of the particular setting of the communications module. It should be understood that in other embodiments a selection of the particular selecting may be performed by actuating the touch pad 104A (e.g., translating the touch pad 104A, contacting the capacitive touch surface 105A with a predetermined pattern, and/or the like).

The above-described system includes components that provide multi-function input apparatuses for selective control and operation of one or more devices or systems of a vehicle (e.g., an HVAC device, an audio system, a visual interface or heads-up display, a communication module, and the like) at a central location within a passenger cabin of the vehicle. The multi-function input apparatus may be positioned along a steering wheel of the vehicle to facilitate ease of access for an occupant of the vehicle. A manual actuation of an outer button of the multi-function input apparatus, and specifically a depression of the outer button, may provide a selective selection and activation of various vehicle systems. A manual actuation of a touch pad of the multi-function input apparatus, and specifically contacting a capacitive surface of the touch pad, may further provide an elaborate navigation and/or control of a plurality of settings relative to the vehicle system actuated. The multi-function input apparatus may generally include a confirmation button that generates a confirmatory input command when controlling the various vehicle systems and corresponding settings.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A multi-function input apparatus of a steering wheel, the multi-function input apparatus comprising:
   a plurality of outer buttons, the plurality of outer buttons correspond to a plurality of vehicle systems such that actuation of at least one of the plurality of outer buttons selects a corresponding vehicle system from the plurality of vehicle systems;
   a touch pad having a capacitive touch surface, the touch pad is position adjacent the plurality of outer buttons such that the plurality of outer buttons border a first edge of the touch pad, in response to actuation of the capacitive surface the touch pad is configured to navigate through and select a setting of a plurality of settings of the selected vehicle system; and a confirmation button positioned to border a second edge of the touch pad, the second edge being adjacent to and different from the first edge of the touch pad, the confirmation button corresponds to a confirmation input such that actuation of the confirmation button actuates the selected setting of the selected vehicle system.

2. The multi-function input apparatus of claim 1, wherein the plurality of outer buttons and the confirmation button are elevated relative to the capacitive surface of the touch pad.

3. The multi-function input apparatus of claim 1, wherein the plurality of outer buttons generates a tactile feedback in response to actuation of the plurality of outer buttons.

4. The multi-function input apparatus of claim 1, wherein the plurality of outer buttons generates an audible feedback in response to actuation of the plurality of outer buttons.

5. The multi-function input apparatus of claim 1, wherein selected vehicle system is unselected in response to actuation of at least one of the plurality of outer buttons.

6. The multi-function input apparatus of claim 1, wherein the touch pad is selectively depressible and is configured to actuate the selected setting of the plurality of settings in response to a depression of the touch pad.

7. The multi-function input apparatus of claim 6, wherein the actuation of the confirmation button is configured to actuate the selected setting of the plurality of settings.

8. The multi-function input apparatus of claim 1, wherein the plurality of outer buttons are resiliently biased to inhibit a depression of plurality of the outer buttons.

9. The multi-function input apparatus of claim 1 further comprising a display device,
wherein the touch pad is communicatively coupled to the display device such that actuation of the capacitive surface of the touch pad displays the plurality of vehicle systems on the display device.

10. The multi-function input apparatus of claim 9, wherein actuation of the touch pad displays on the display device the plurality of settings of the selected vehicle system.

11. The multi-function input apparatus of claim 1, wherein the touch pad, the plurality outer buttons and the confirmation button are positioned on a center hub of the steering wheel adjacent to an outer rim of the steering wheel.

12. A steering wheel of a vehicle, the steering wheel comprising:
an outer rim;
a center hub disposed within the outer rim; and
an input apparatus positioned on the center hub, the input apparatus includes a plurality of outer buttons, a touch pad, and a confirmation button, the touch pad is positioned adjacent to the plurality of outer buttons and the confirmation button, the touch pad includes a capacitive surface;
wherein the plurality of outer buttons correspond to a plurality of vehicle systems such that actuation of at least one of the plurality of outer buttons selects a corresponding vehicle system,
wherein a plurality of settings of the selected vehicle system are navigable in response to actuation of capacitive surface of the touch pad and at least one of the plurality of settings is selectable in response to actuation of the confirmation button,
wherein, in response to actuating at least one of the plurality of outer buttons, an operability of other outer buttons of the plurality of outer buttons is deactivated.

13. The steering wheel of claim 12, wherein the corresponding vehicle system comprises a Global Positioning System, an HVAC system, or a communications module.

14. The steering wheel of claim 12 further comprising a display device,
wherein the plurality of outer buttons are communicatively coupled to the display device such that the display device displays data indicative of the selected vehicle system corresponding to the actuated outer button.

15. The steering wheel of claim 14, wherein the touch pad is communicatively coupled to the display device such that the display device displays data indicative of the plurality of settings of the selected vehicle system in response to conductive contact with the capacitive surface.

16. A multi-function input apparatus of a vehicle having a steering wheel, the multi-function input apparatus comprising:
a touch pad positioned on the steering wheel of the vehicle, the touch pad including a capacitive surface that is selectively actuated in response to conductive contact with the capacitive surface;
a plurality of outer buttons positioned so as to partially border the touch pad;
a confirmation button positioned so as to partially border the touch pad;
a processor; and
non-transitory computer-readable medium storing computer-readable instructions that, when executed, causes the processor to:
select a vehicle system in response to at least one of the plurality of outer buttons being actuated;
navigate a plurality of settings of the selected vehicle system in response to actuation of the capacitive surface;
actuating at least one of the plurality of settings in response to the confirmation button being actuated; and
in response to actuating at least one of the plurality of outer buttons, deactivating an operability of other outer buttons of the plurality of outer buttons.

17. The multi-function input apparatus of claim 16, wherein the non-transitory computer-readable medium storing computer-readable instructions, when executed, causes the processor to adjust the at least one of the plurality of settings of the selected vehicle system in response to the actuation of the capacitive surface.

18. The multi-function input apparatus of claim 16, wherein the non-transitory computer-readable medium storing computer-readable instructions, when executed, causes the processor to display the plurality of settings of the selected vehicle system on a display device.

* * * * *